3,515,768
PROCESSES FOR SEPARATING A XYLENE MIXTURE INTO ITS COMPONENTS WITH HIGH PURITY
Tamotsu Ueno and Takashi Nakano, Niigata-shi, Japan, assignors to Japan Gas-Chemical Company, Inc., Tokyo, Japan, a corporation of Japan
Filed June 3, 1966, Ser. No. 555,168
Claims priority, application Japan, June 3, 1965, 40/32,915; June 23, 1965, 40/37,735
Int. Cl. C07c 7/10, 15/08
U.S. Cl. 260—674                                      7 Claims

ABSTRACT OF THE DISCLOSURE

A xylene mixture containing m-xylene is separated into an HF extract phase containing m-xylene of high purity and a raffinate phase substantially free of m-xylene by contacting said xylene mixture with an extracting agent consisting of HF and $BF_3$ and with a mixture of reflux m-xylene and extraction diluent under operating conditions wherein the molar ratio of $BF_3/HF$ in the HF extract has a value between 0.02 and 0.12, the molar ratio $\gamma$ of reflux m-xylene to the mixture of diluent and reflux m-xylene has a value between 0.3 and 1.0, and the molar ratio $\alpha$ of total m-xylene to $BF_3$ has a value of from 0.96 to 1.04 times the value of molar ratio $\beta m$ of m-xylene to $BF_3$ in the HF extract, $\beta m$ being determined by applying the above values of $BF_3/HF$ ratio and $\gamma$ to the $\gamma-\beta m$ equilibrium relation diagram shown in FIG. 2 wherein $BF_3/HF$ is the parameter; other xylene isomers may be separated from the raffinate phase.

---

This invention relates to a continuous process for extracting and recovering m-xylene from a mixture containing m-xylene and at least one xylene isomer (including ethyl benzene) other than m-xylene. Particularly, this invention relates to a continuous process for the extractive separation of high purity m-xylene from a mixture containing m-xylene and at least one xylene isomer other than m-xylene. This invention relates more to a process for obtaining raffinate comprising substantially at least one xylene isomer other than m-xylene, by the continuous extraction of m-xylene from a mixture containing m-xylene and at least one xylene isomer other than m-xylene. Particularly this invention relates to a process for separating high purity m-xylene, ethylbenzene, p-xylene and o-xylene from a mixture of them. Furthermore, this invention relates to a process for producing most usable xylene isomers with high purity in which process m-xylene, ethyl benzene, p-xylene and o-xylene are successively separated from a xylene mixture containing them, and said separated m-xylene and/or o-xylene are subjected to an isomerization reaction, and then thus gained isomerization product is added to above said xylene mixture.

Still more particularly, this invention relates to a process for separating each xylene isomers with high purity in which process m-xylene is extracted from a mixture containing m-xylene, ethylbenzene, p-xylene and o-xylene, and then, ethylbenzene and o-xylene are separated by rectification to give concentrated p-xylene, and the p-xylene concentrate is passed to p-xylene crystallizer to obtain crystals of p-xylene with high purity.

An object of the present invention is to provide a process for obtaining high purity m-xylene and, at the same time, a raffinate xylene solution which is substantially composed of xylenes other than m-xylene. For such a process as employing HF and $BF_3$ as extraction reagents for m-xylene, in the present invention particularly selected conditions for the selective extraction of m-xylene from the xylene mixture have been employed.

Another object of the present invention is to provide a process for the selective extraction of m-xylene from the xylene mixture containing m-xylene, ethylbenzene, p-xylene and o-xylene to obtain high purity m-xylene and a raffinate xylene solution consisting of xylene substantially free from m-xylene.

The raffinate xylene solution containing substantially other xylenes than m-xylene can be subjected to rectifying distillation to separate successively highly purified ethylbenzene, p-xylene and o-xylene.

Furthermore object of the present invention is to provide a process for separating crystals of p-xylene with high purity from concentrated p-xylene.

Boiling points of ethylbenzene, o-xylene, m-xylene and p-xylene in their mixture, particularly those of m-xylene and p-xylene are so close to each other (difference of m-xylene and p-xylene is 0.75° C.), that the separation of each constituent of said xylene mixture, particularly the separation of high purity m-xylene and p-xylene by fractional distillation was not possible. Japanese patent publication No. 1583/53 discloses a basic principle to extract and separate m-xylene from xylene mixtures in which liquid HF and $BF_3$ are used as extracting reagents. However, that invention relates to a process for separating about 80% purity m-xylene from xylene mixtures. That invention cannot provide a commercially available method for the separation of a xylene mixture into its components with high purity, while preventing undesirable side reactions of ethylbenzene, which is useful for the raw material of stylene monomer.

According to the basic principle of the publication No. 1583/58, when liquid HF and $BF_3$ are added to a xylene mixture containing ethylbenzene, o-xylene, m-xylene and p-xylene, then HF and $BF_3$ combine with xylenes in said xylene mixture to form m-xylene-$BF_3$-HF complex. m-Xylene concentration in this complex layer is higher than that in the xylene layer. Therefore, by the separation of thus formed HF extract—m-xylene-$BF_3$-HF complex extract—from the xylene mixture, m-xylene in the xylene mixture may be concentrated. However, the publication No. 1583/58 did not disclose the nature of chemical bond of HF and $BF_3$ to xylene isomers, and especially their stoichiometric relation, particularly in such a case that xylene-$BF_3$-HF complex is dissolved in excess of HF. It only estimates that the molar ratio of xylene isomer to $BF_3$ in HF solution may be 1:1.

We have found that above-mentioned molar ratio of $BF_3$ is not available to separate m-xylene exclusively from a xylene mixture by multistage extraction. Insofar as $BF_3$ in such a molar ratio is supplied, high purity m-xylene cannot be separated in a good yield from a xylene mixture. Particularly it is impossible to obtain high purity m-xylene, along with a raffinate xylene solution consisting of xylene isomers other than m-xylene.

We have studied the solubility of m-xylene and $BF_3$ into HF phase and surveyed the effect of $BF_3/HF$ ratio in the HF phase, degree of dilution of xylene phase by saturated hydrocarbons, temperature, etc., upon the said solubility. We found that there is a strict interphase equilibrium for the partition of m-xylene into both HF phase and xylene layer, having $BF_3/HF$ ratio in the HF phase and m-xylene mole fraction in xylene phase as the effective variables when the temperature is kept constant. And we also found that m-xylene/$BF_3$ ratio in the HF phase can take the value ranging from about 0.9 to 2.0 or even more. Using this equilibrium relation we have made it possible to obtain a HF extract essentially consisting of m-xylene and at the same time a raffinate xylene solution substantially free from m-xylene.

Furthermore, we have made it possible to separate ethylbenzene and o-xylene from said raffinate xylene solution by rectification to obtain p-xylene concentrate and separate the crystal of p-xylene with purity of 98% up from said p-xylene concentrate by fractional crystallization at the range of −5°∼0° C. of temperature. When we try to separate the crystal of p-xylene from the usual xylene mixture by fractional crystallization, it needs low temperature as −65°∼−75° C. and obtain only 65∼90% purity of p-xylene.

Now we describe a method to determine a molar ratio of xylene-$BF_3$ in a HF extract. Liquid HF and a xylene isomer with or without saturated hydrocarbon such as hexane are charged into a graduated vessel of poly-trifluoromonochloroethylene (trade name: Kel-F) which has been precalibrated (inner volume about 300 cc. with a jacket and a stirrer). A known quantity of $BF_3$ is added into the vessel while stirring.

$BF_3$ being absorbed, stirring is ceased and the inner liquid stands still. And then volumes of the xylene phase and HF phase are measured. The volume of xylene which is extracted in the HF phase can be determined as the volume difference of it between, before and after the extraction. An additional amount of $BF_3$ is added and similar measurement is done. Similar operation is repeated several times. Thus various molar quantities of a xylene isomer and $BF_3$ which are absorbed in the HF phase may be determined. When the vapour pressure of the system is low, added quantity of $BF_3$ can be determined by the volume change of a calibrated gas holder from which $BF_3$ gas is supplied. When the vapour pressure of the system is higher than atmospheric pressure, $BF_3$ is supplied from a $BF_3$ tank of known volume. From the compressibility factor of the gas and the change of the tank pressure, added quantity of $BF_3$ can be determined. The vessel to be used for the extraction is kept at a predetermined temperature during the operation. $BF_3$ dissolved in the HF phase is the difference between the total $BF_3$ charged and a combined quantity of $BF_3$ dissolved in the hydrocarbon phase and left in the vapour phase.

Using above described method, a series of m-xylene-$BF_3$ molar ratio in the HF extract is determined in both cases using pure m-xylene only and using m-xylene diluted with known quantities of diluent. An example of the relation between the $BF_3$/HF molar ratio in the HF extract and the m-xylene/$BF_3$ ratio in the HF extract, which is determined at 0° C., using n-hexane as the diluent is shown in Table 1 and FIG. 1.

xylene concentration in the hydrocarbon phase—and that in some domain of $BF_3$/HF, the values of $\beta m$ may be largely apart from 1. $\beta m$ values are recalculated as the function of $\gamma$ using $BF_3$/HF in HF extract as parameter availing the curves in FIG. 1 and the like. The resulting curves are shown in FIG. 2, in which $$\beta \equiv \frac{\text{Total xylene isomers in HF extract (mol)}}{BF_3 \text{ in HF extract (mol)}}$$

($\beta m$: $\beta$ in case where xylene isomer is pure m-xylene)

$$\gamma \equiv \frac{\text{xylene in hydrocarbon phase (mol)}}{\text{xylene in hydrocarbon phase (mol)} + \text{diluent in hydrocarbon phase (mol)}}$$

Figure 2:
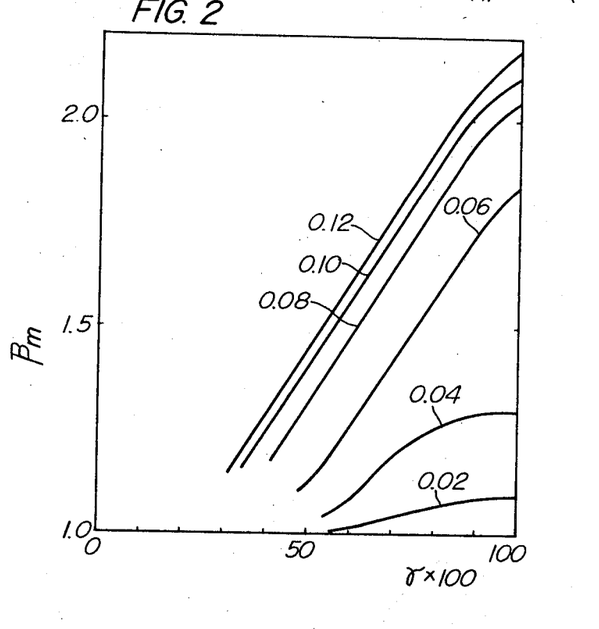
FIG. 2 is a $\gamma$—$\beta m$ equilibrium relation diagram in which $\beta m$ shows the molar ratio of m-xylene/BF$_3$ in the HF extract, $\gamma$ shows the mole fraction of xylene in the hydrocarbon phase, and BF$_3$/HF is parameter.

The $\gamma - \beta m$ relation such as shown in FIG. 2 is particularly important for the selective extraction of m-xylene from xylene mixture.

Thus, according to this invention a process for continuously extracting and separating m-xylene from a xylene mixture containing m-xylene and at least one xylene isomer other than m-xylene, comprising charging said xylene mixture, reflux m-xylene, diluent, and liquid HF and $BF_3$ to a m-xylene extractor, and extracting m-xylene in a continuous countercurrent extraction system, characterized by selectively extracting m-xylene from said xylene mixture under operating conditions of said extractor comprising such selected facts as follows;

A molar ratio of $BF_3$/HF in the HF extract withdrawn from said m-xylene extractor is selected to a value between 0.02 and 0.12; $\gamma$ which signifies a mole fraction of xylene in the hydrocarbon phase in the HF extract-outlet portion (the final stage) of said extractor is selected to a value between 0.3 and 1.0; $\alpha$ which signifies a molar ratio of total m-xylene (m-xylene in above said xylene mixture plus reflux m-xylene) to $BF_3$ charged to said extractor, is selected to a value from 0.96 to 1.04 times as much as a value of $\beta m$, $\beta m$ being determined by applying the above selected values of $BF_3$/HF ratio and $\gamma$ to the $\gamma - \beta m$ diagram as shown in FIG. 2, is provided.

To improve the selectivity of the extraction in multistage countercurrent continuous system, and to obtain high purity m-xylene complex, diluent (one of saturated aliphatic hydrocarbons having $C_4$–$C_6$ or their mixture) and high purity reflux m-xylene are added to the extractor. In such a case corresponding theoretical number of extraction stages must be required. Provided high purity TABLE 1
[Temperature=0° C.]

| No. | Charged m-xylene, mole | Charged m-hexane, mole | Charged HF, mole | $BF_3$ absorbed in HF, mole | $BF_3$/HF, mole/mole ×100 | $BF_3$/charged m-xylene, mole/mole | m-Xylene dissolved in HF, mole | m-Xylene in HF/$BF_3$ in HF, mole/mole |
|---|---|---|---|---|---|---|---|---|
| 1 | 1.130 | | 3.45 | 0.099 | 2.88 | 0.090 | 0.116 | 1.17 |
|   |       |   |      | 0.217 | 6.28 | 0.192 | 0.406 | 1.87 |
|   |       |   |      | 0.311 | 9.03 | 0.283 | 0.662 | 2.13 |
|   |       |   |      | 0.496 | 14.40 | 0.440 | 1.070 | 2.16 |
|   |       |   |      | 0.546 | 15.80 | 0.484 | 1.130 | 2.07 |
| 2 | 0.942 | 0.233 | 3.40 | 0.294 | 8.64 | 0.312 | 0.492 | 1.67 |
|   |       |       |      | 0.469 | 13.80 | 0.498 | 0.656 | 1.40 |
|   |       |       |      | 0.682 | 20.03 | 0.723 | 0.729 | 1.07 |
| 3 | 0.658 | 0.349 | 3.40 | 0.145 | 4.26 | 0.220 | 0.157 | 1.08 |
|   |       |       |      | 0.294 | 8.65 | 0.447 | 0.372 | 1.27 |
|   |       |       |      | 0.415 | 12.21 | 0.632 | 0.488 | 1.18 |
|   |       |       |      | 0.586 | 17.25 | 0.892 | 0.530 | 0.90 |

Figure 1:
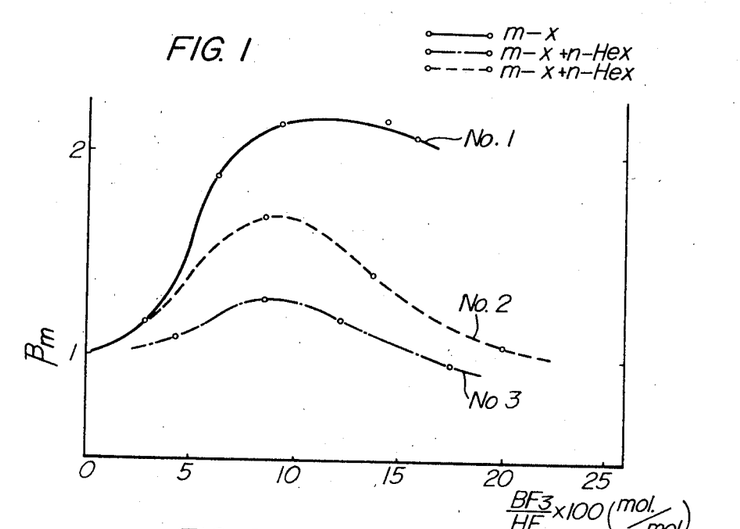
FIG. 1 is a diagram showing the relation between $\beta m$, or molar ratio of m-xylene/BF$_3$ in the HF extract, and BF$_3$/HF.

Similar result can be obtained at a different temperature and using another kind of diluent ($C_4$–$C_6$ aliphatic hydrocarbon). By similar experiments using xylene mixtures with various concentration of m-xylene, it is found that $\beta$ (total xylene isomers in HF extract/$BF_3$ in HF extract) is substantially equal to $\beta m$ (m-xylene in HF extract/$BF_3$ in HF extract in case that xylene in both phase is substantially pure m-xylene) insofar as m-xylene concentration in HF extract (based on xylene) is 94% or more. Diluent stays substantially present in xylene phase and acts as diluent for xylene. In FIG. 1 it is clearly shown that the $\beta m$—m-xylene/$BF_3$ molar ratio in HF extract depends on the $BF_3$/HF in HF extract and $\gamma$—the extracted m-xylene, along with a raffinate xylene solution substantially free from m-xylene are required, enough $BF_3$ and HF (or $BF_3$/HF and $BF_3$) to extract all m-xylene—m-xylene in fed xylene mixture and reflux m-xylene—into HF extract must be used. $BF_3$ quantity to be required is got from the division of total m-xylene feed by $\beta m$. Value of $\beta m$, or m-xylene/$BF_3$ molar ratio in HF extract can be found in $\gamma - \beta m$ diagram as shown in FIG. 2, when $BF_3$/HF molar ratio in the HF extract at the final stage of the extractor from which the HF extract is withdrawn, $\gamma$ or the mole fraction of xylene in the hydrocarbon phase which is in equilibrium state with said HF extract—and temperature are determined. HF quantity to be added is obtained, dividing above determined $BF_3$ quantity by said $BF_3/HF$ molar ratio in the HF extract. Theoretically speaking, $\gamma-\beta$ relation diagram corresponding to the purity of m-xylene in the HF extract at the final stage of the extractor, must be used. In $\gamma-\beta$ relation, $\beta$ is affected by the purity of m-xylene in the HF extract, and apt to decrease with the lower purity of my-xylene in the HF extract. However, if m-xylene concentration in HF extract is 94 molar percent or more (xylene base) $\beta$ can be regarded not to be changed by the purity of m-xylene, and $\gamma-\beta m$ diagram in FIG. 2 can be used. Because a small amount of HF and $BF_3$ is dissolved in the raffinate xylene solution, additional amounts to compensate it are necessary to keep a correct $BF_3/HF$ ratio in the HF extract. Thus, a ratio of m-xylene to the diluent in the final stage, or a HF extract withdrawal section of the extractor, may be regarded equal to a ratio of the supplied reflux m-xylene to the diluent fed to a extractor from the same point at which reflux m-xylene is fed, plus diluent fed from other points positioned opposite to a point at which feed m-xylene is charged. Therefore, the quantity of above-mentioned feed diluent can be calculated from the following equation:

$$\text{feed diluent} = \frac{1-\gamma}{\gamma} \times (\text{feed reflux m-xylene})$$

In the range of 0.02–0.12 of $BF_3/HF$ molar ratio in a HF extract, suitable combinations of a xylene concentration $\gamma$ in the hydrocarbon phase, a reflux ratio of m-xylene $$\longrightarrow \frac{\text{Reflux xylene (mol)}}{\text{Total xylene in HF extract (mol)} - \text{reflux xylene (mol)}}$$

and a number of theoretical plates are shown in Table 2.

TABLE 2

| $\gamma \times 100$ | Reflux xylene ratio | Number of theoretical plate |
|---|---|---|
| 100–70 | 4–6 | 10–20 |
| 80–50 | 3–5 | 5–15 |
| 60–40 | 1.6–4 | 3–10 |
| 50–30 | 1.3–2.5 | 3–7 |
| 35–30 | 0.9–1.5 | 2.5–5 |

Adopting one of these combinations of three quantities it is possible to extract selectively m-xylene from a xylene mixture to obtain a HF extract dissolving m-xylene of more than 98 mol percent purity (xylene base) and a raffinate xylene solution containing less than 0.4 mol percent of m-xylene (xylene base).

Particularly, if the HF extract containing 94 mol percent or more m-xylene (xylene base) and a raffinate xylene solution containing below 3 mol percent m-xylene (xylene base) are desired, $\alpha$ which signifies a molar ratio of the total m-xylene to $BF_3$ supplied to m-xylene extractor, is selected to a value between $0.96\beta m$ and $\beta m$. In this case suitable combinations as shown in Table 2 are available. If the combination of max. reflux m-xylene ratio and max. number of theoretical plate are employed, it is possible to make m-xylene concentration in a raffinate xylene solution substantially below 0.4 mol percent.

Furthermore, if a HF extract containing 98 mole percent or more m-xylene (xylene base) and a raffinate xylene solution containing below 10 mol percent m-xylene (xylene base) are desired, $\alpha$ which signifies a ratio of the total m-xylene to $BF_3$ supplied to m-xylene extractor, is selected to a value between $\beta m$ and $1.04\beta m$. In this case, too, suitable combinations as shown in Table 2 are available. If the combination of max. reflux ratio and max. number of theoretical plate are employed, it is possible to make m-xylene concentration (xylene base) in the HF extract substantially 99.6 mole percent or more.

As to other operating conditions of m-xylene extractor speaking, an inside temperature between $-20°$ to $+30°$ C., and an inside pressure is higher than the vapour pressure of xylene-$BF_3$-HF complex in the HF extract, that is, 1 to 20 kg./cm.$^2$ are chosen. Diluent increases the selectivity to m-xylene, and at the same time, depresses undesirable side reactions of ethylbenzene. Diluent includes carbon tetrachloride besides aliphatic hydrocarbons having $C_4$–$C_6$. The plate efficiency of a m-xylene extractor depends on types of the extractor employed. Type of extractor which can be used for this invention includes packed tower, perforated plate column, pulse-tower-with-perforated plates, extractor with stirrer, mixer-settler etc.

According to the present invention it is possible to obtain a raffinate xylene solution substantially free from m-xylene. From this raffinate xylene solution a small amount of HF, $BF_3$, diluent, benzene, toluene etc. are removed to obtain a raffinate xylene containing o-xylene, p-xylene and ethylbenzene. Because their boiling points are so different as shown in Table 3 that they are possible to be separated by a conventional fractional distillation process, or by the combination of fractional distillation and fractional crystallization of one stage.

TABLE 3

| | Boiling point, ° C. | Difference, ° C. |
|---|---|---|
| Xylene isomer: | | |
| o-Xylene | 144.41 | |
| p-Xylene | 138.35 | 6.06 (from o-xylene). |
| Ethylbenzene | 136.19 | 2.16 (from p-xylene). |

Therefore, according to the present invention a process for separating highly purified ethylbenzene, m-xylene, o-xylene and p-xylene from a xylene mixture containing them, characterized by comprising; the first step, in which a HF extract consisted of m-xylene-$BF_3$-HF complex and a raffinate xylene solution substantially free from m-xylene are obtained by the selective and continuous multi-stage extraction of m-xylene from said xylene mixture under the specified operating conditions of a m-xylene extractor comprising a molar ratio of $BF_3/HF$ in the HF extract withdrawn from said m-xylene extractor being selected to a value between 0.02 and 0.12, $\gamma$ which signifies mole fraction of xylene in the hydrocarbon phase (a molar ratio of reflux m-xylene to a mixture of charged diluent and reflux m-xylene) in the HF extract withdrawal section of said m-xylene extractor being selected to a value between 0.3 and 1.0, and $\alpha$ which signifies a molar ratio of the total m-xylene (m-xylene in above said xylene mixture plus reflux m-xylene) to $BF_3$ charged to said m-xylene extractor being selected to a value from 0.96 to 1.0 times as much as a value of $\beta m$, $\beta m$ being determined by applying the above selected values of $BF_3/HF$ ratio and $\gamma$ to the $\gamma-\beta m$ equilibrium relation diagram as shown in FIG. 2 ($\beta m$ is a molar ratio of m-xylene-$BF_3$ in the HF extract); the second step, in which said raffinate xylene solution is passed to a raffinate xylene solution stripper to remove smaller amounts of HF, $BF_3$, diluent, benzene, toluene etc. from the top of said stripper and to obtain raffinate xylenes from the bottom of said stripper; the third step in which said raffinate xylenes are passed to an ethylbenzene rectifying tower to obtain highly purified ethylbenzene from its top and rectified xylenes substantially free from ethylbenzene from its bottom; the fourth step in which said rectified xylenes are passed to a p-xylene rectifying tower to obtain highly purified p-xylene from its top and highly purified o-xylene from its bottom; and the fifth step in which said m-xylene-$BF_3$-HF complex from the first step is passed to a HF extract stripper to remove HF and $BF_3$ from its top and to obtain a crude m-xylene from its bottom, and then thus obtained crude m-xylene residue is passed to a m-xylene fractionator to obtain highly purified m-xylene from its top and aromatic hydrocarbons having carbon atoms 9 or more from its bottom, and part of thus produced highly purified m-xylene or part of said crude m-xylene residue is fed as reflux m-xylene in the first step, is provided.

If the highly purified p-xylene is not obtained by only rectification in the fourth step, a modified fourth step, in which the rectified xylene from the third step is passed to an o-xylene rectifying tower to obtain a concentrated p-xylene fraction from the top thereof and highly purified o-xylene from the bottom thereof, and said p-xylene concentrate is passed to a p-xylene crystallizer to obtain highly purified crystals of p-xylene and residual mother liquor, are selected. Furthermore if desired, the third step about ethylbenzene rectification and the fourth step about o-xylene rectification can be reversed.

Xylene isomers are widely used for example ethylbenzene is used as the raw material for stylene monomer, o-xylene is used for phtharic anhydride and p-xylene is used for terephtharic acid. m-Xylene which has few usage can be isomerized to more useful o-xylene and p-xylene. In some cases, o-xylene can be converted through m-xylene to p-xylene.

Thus, according to the present invention a process for separatnig highly purified ethylbenzene, m-xylene, o-xylene and p-xylene from a xylene mixture containing them, characterized by comprising; the first step, in which a HF extract containing m-xylene-BF$_3$-HF complex and a raffinate xylene solution substantially free from m-xylene are obtained by the selective and continuous multistage extraction of m-xylene from said xylene mixture under the specified operating conditions of a m-xylene extractor comprising a molar ratio of BF$_3$/HF in the HF extract withdrawal section of said m-xylene extractor being selected to a value between 0.02 and 0.12 $\gamma$ which signifies mole fraction of xylene in the hydrocarbon phase (a molar ratio of reflux m-xylene to a mixture of charged diluent and reflux m-xylene) in the HF extract withdrawal section (the final stage) of said m-xylene extractor being selected to a value between 0.3 and 1.0, $\alpha$ which signifies a molar ratio of total m-xylene (m-xylene in above said xylene mixture plus reflux m-xylene) to BF$_3$ charged to said m-xylene extractor being selected to a value from 0.96 to 1.0 times as much as a value of $\beta m$, $\beta m$ being determined by applying the above selected values of BF$_3$/HF ratio and $\gamma$ to the $\gamma$—$\beta m$ equilibrium relation diagram as shown in FIG. 2 ($\beta m$ is a molar ratio of m-xylene-BF$_3$ in the HF extract); the second step in which said raffinate xylene solution is passed to a raffinate xylene solution stripper to remove small amounts of HF, BF$_3$, diluent, benzene, toluene etc. from the top of said stripper and to obtain raffinate xylene from the bottom of the stripper; the third step in which said raffinate xylenes are passed to an ethylbenzene rectifying tower to obtain highly purified ethylbenzene from its top and rectified xylenes substantially free from ethylbenzene from its bottom; the fourth step in which said rectified xylenes are passed to a p-xylene rectifying tower to obtain highly purified p-xylene from its top and highly purified o-xylene from its bottom; the fifth step in which part of m-xylene-BF$_3$-HF complex from the first step is passed to a HF extract stripper to remove HF and BF$_3$ from its top and to obtain crude m-xylene from its bottom, and thus obtained crude m-xylene is passed to a m-xylene fractional distilation tower to obtain highly purified m-xylene from the top of said m-xylene fractionator and high boiling point aromatic hydrocarbons having 9 or more carbon atoms from the bottom of said tower, and part of thus produced highly purified m-xylene or part of said m-xylene residue is fed as reflux m-xylene in the first step, and the sixth step in which the remainder of said m-xylene-BF$_3$-HF complex in the fifth step and at least a portion of crude m-xylene separated in the fifth step and/or at least a portion of highly purified o-xylene separated in the fourth step are charged, with or without an isomerization diluent to an isomerization reactor to obtain isomerization product having compositions similar to the thermodynamic equilibrium composition, and thus obtained isomerized product consisted of a hydrocarbon phase and a HF phase is passed to an isomerizate stripper to remove HF, BF$_3$, and the isomerization diluent from its top and to obtain isomerized xylene from its bottom, and thus obtained isomerized xylene from which the isomerization diluent has been removed or not removed is added to said xylene mixture in the first step, is provided.

Xylene mixtures particularly useful for the feed material of the present invention include B.T.X. fraction obtained from catalytic reforming of petroleum oils or catalytic cracking of petroleum naphtha by the aromatic extraction processes such as, for example, Udex process, phenol extraction process, Edeleanu process, Arosorb process, sulfolan process etc., B.T.X. fraction from tar, and xylene fraction from above described B.T.X. Furthermore, xylene mixtures obtained from isomerization reaction of m-xylene and/or o-xylene and having compositions near the thermodynamical equilibrium composition at the reaction temperature can be used, for the feed material for the present invention.

The invention will now be described in greater detail with reference to the accompanying drawings in which.

Figure 3:
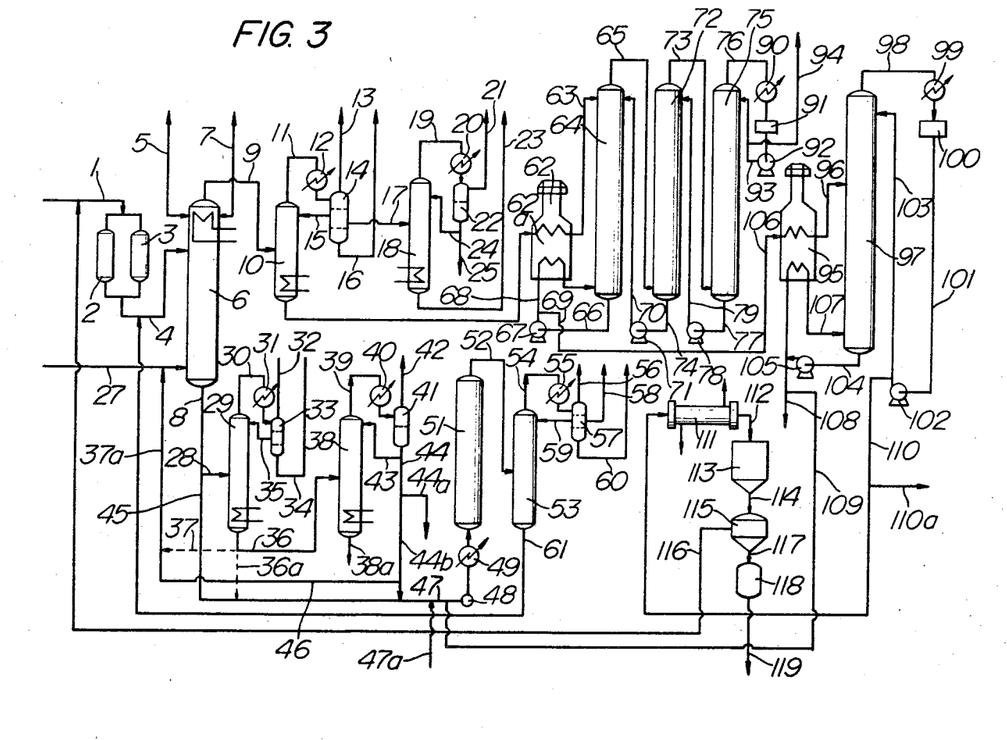
FIG. 3 is a flow sheet diagram illustrating one embodiment of the present invention.

Referring to FIG. 3, a raw material xylene mixture is introduced into a drier 2 or 3 through a pipe 1. Xylene mixture from the drier 2 or 3 is fed to a m-xylene extractor 6 through a pipe 4. A major part of HF in liquid state is injected into the top of the extractor through a pipe 5. A major part of BF$_3$ which has been precompressed is injected into the top of the extractor through a pipe 7. The extractor is provided with a cooling coil which is positioned inside the extractor and near the points of injection of HF and BF$_3$. In some special case, the extractor is provided with a stirrer. In some case in which stirring by the stirrer provided in the m-xylene extractor is not sufficient to form xylene-BF$_3$-HF complex, a raffinate xylene-solution withdrawal pipe 9 is introduced into another agitation tank or mixer (not shown). Into this tank or mixer a major part of HF and BF$_3$ is blown to form xylene-BF$_3$-HF complex, and then xylene-HF mixed solution is charged to a separating tank (not shown). A supernatant raffinate xylene layer is passed to a raffinate xylene solution stripper and a lower HF layer is recycled to the uppermost zone of the m-xylene extractor (not shown). Extraction diluent is charged to a lower part of the m-xylene extractor 6 through a pipe 27. Reflux m-xylene is introduced into the pipe 27 through a pipe 46. Reflux m-xylene combined with the diluent is injected into a lower part of the m-xylene extractor 6.

HF extract containing xylene-BF$_3$-HF complex flows down the extractor and is withdrawn from the bottom through a pipe 8. Raffinate xylene solution composed of the diluent and xylene flow up countercurrently to the flow of the HF extract, and is withdrawn from the top through the pipe 9. In a case in which heavy diluent such as carbon tetrachloride is used, flows of the HF extract and the raffinite xylene solution are inversed. In such a case HF and BF$_3$ charged from the bottom of the extractor are withdrawn from the top, and the diluent and reflux-m-xylene charged from the top are withdrawn from the bottom (not shown).

HF extract containing m-xylene and little other xylenes is withdrawn from the m-xylene extractor through a pipe 8. All the HF extract is passed to a HF extract stripper 29, provided part of the HF extract is not recycled to an isomerization process. From the bottom of the stripper, crude m-xylenes containing m-xylene and high boiling aromatic hydrocarbons having 9 or more carbon atoms are withdrawn through a pipe 36, while substances of a lower boiling point than xylene such as HF, BF$_3$, and a small amount of benzene, toluene and other light hydrocarbons are withdrawn from the top through a pipe 30. Sometimes a constant amount of hydrocarbons having boiling points between 40° and 70° C. is necessary to be retained in the HF extract stripper 29. The vapour from the top is introduced into a separator 33 through a cooler 31. In the separator 33 a lower and first liquid layer predominantly composed of HF, a middle and second layer predominantly of said hydrocarbons and an upper vapour phase essentially consisted of HF and BF$_3$ are separated. HF of the first layer is passed into an intermediate tank (not shown) through a pipe 34 and is reused as the extraction reagent in the m-xylene extractor. The second layer containing predominantly said hydrocarbons is refluxed into the HF extract stripper 29 through a pipe 35, and the vapour essentially consisted of HF and BF$_3$ is passed to a gasholder (not shown) thorugh a pipe 32 and is reused. The actual number of plates of the HF extract stripper 29 is between 20 and 30 and a sufficient heat quantity to be supplied to the bottom of the stripper is 1.1–1.5 as much as required for the decomposition and vaporization of the HF extract.

The residual HF and BF$_3$ left in the xylene from the bottom can be less than 0.01 and 0.1 wt. percent, respectively. And the xylene concentration in the hexane distilled from the top can be less than 0.1 mole percent. The HF extract stripper 29 may be substituted by a bubble cap tower, a suitable type film evaporator, or a rapid evaporator provided with high frequency heater(s). m-Xylene purity (xylene base) of a xylene fraction of the crude m-xylene liquid withdrawn through the pipe 36 may be increased up to 98 mole percent or more, depending on the construction and operating conditions of the m-xylene extractor 6. A part of the aromatic hydrocarbons withdrawn from the pipe 36 may, sometimes, be injected into the pipe 27 through a pipe 37 (dotted line) to be used as a reflux flow for the m-xylene extractor. The remainder of the hydrocarbons in the pipe 36 is charged into a m-xylene fractionator 38. This m-xylene fractionator is one of ordinary fractionators. From the bottom of this tower high boiling aromatic hydrocarbons having 9 or more carbon atoms is withdrawn through a pipe 38a, while m-xylene from the top through a pipe 39, is passed into a reflux drum through a cooler 40. A part of this m-xylene is recycled to the m-xylene fractionator 38 through a pipe 43, and the balance is withdrawn through pipes 44, and 44a as the product. The m-xylene fractionator 38 may have an actual number of plates between 30 and 50, and a reflux ratio between 0.5 and 2. Aromatic hydrocarbons having 9 or more carbon atoms in the top distillate can be lowered below 0.5 mole percent, while the xylene concentration in the bottom residue below 20 mole percent. A part of the distilled m-xylene is recycled as reflux for the m-xylene extractor through pipes 44b and 46.

The raffinite xylene solution, a mixture of the diluent and the xylene mixture which contains little m-xylene is withdrawn from the m-xylene extractor 6 through a pipe 9. The m-xylene concentration (xylene base) in the raffinate xylene solution may be lowered less than 2 mole percent by the selection of structure and operating conditions of the m-xylene extractor 6. The raffinate xylene solution is injected into a raffinate xylene solution stripper 10 to drive off entrained HF, BF$_3$, benzene, toluene, and the diluent, from the top. These mixed vapours are passed into a separator 14 through a cooler 12 to be separated into the lower first phase mainly containing HF, the middle and second phase mainly of the diluent, and the top vapour phase mainly of HF and BF$_3$ vapours. The HF phase is withdrawn through the pipe 16 to be reused. A part of the liquid mainly of the diluent is recycled and refluxed into the raffinate xylene liquid stripper 10 through a pipe 15, while the balance is injected into a diluent fractionator 18. The upper vapour phase is passed to a gasholder (not shown) through pipe 13 and to be reused. The raffinate xylene fractionator 10 is one of bubble cap towers, and has an actual number of plates between 15 and 30 and a reflux ratio between 0.2 and 1. Hydrocarbons having carbon atoms less than 7, HF and BF$_3$ in the bottom residual xylene may be less than 0.04 mole percent, 0.01 wt. percent, respectively.

When n-hexane is used as a diluent, xylene in the top distillat may be 0.1 mole percent. The diluent fractionator 18 is one of ordinary type fractionators. The diluent is withdrawn from the top and benzene, toluene etc. are from the bottom. Diluent is reused through pipe 21. The diluent distillation tower 18 used is a bubble cap tower having an actual number of plates between 60 and 80, and a reflux ratio between 3 and 4. The raffinate xylenes withdrawn from the bottom of the raffinate xylene solution stripper 10 is charged into the first tower 64 of a series of three ethylbenzene rectifying towers 64, 72 and 75, through a pipe 26 and a heating furnace 62. Ethylbenzene rectifying towers used are perforated plate towers having the total actual number of plates between 330 and 380 and a reflux ratio between 80 and 250. Because the ethylbenzene rectifying tower has many total actual number of plates, it is shown in the FIG. 3 as a series of three separated towers. However, the number of the separation is not limited to three. Vapour from the top of the ethylbenzene rectifying tower 64 is directly injected into the bottom of the second tower 72 through a pipe 65, and the similar process is done for the third tower 75. The rectified ethylbenzene from the top of the third tower 75 is recycled to the top of the third tower 75 by a pipe 93 through a cooler 90 and a reflux drum 91. A part of the ethylbenzene is withdrawn from a pipe 94 as the product. The bottom liquid from the third tower 75 is fed back to the top of the second tower 72 through pipes 77. The bottom liquid from the second tower 72 is treated similarly. The residual xylene from the bottom of the ethylbenzene rectifying tower 64 is passed through pipes 66 and 68 to a heating furnace 50, where it is reheated to be fed back to the tower 64. A part of the residual xylenes in the pipe 68 are withdrawn through a pipe 69 to be charged to the next o-xylene rectifying tower. Suitably selecting the operating conditions of the ethylbenzene rectifying tower such as a number of plates and a reflux ratio, ethylbenzene exceeding 99.6 mole percent may be obtained from the top, while the residual xylenes containing ethylbenzene less than 2 mole percent may be obtained from the bottom. The residual xylenes in the pipe 69 are charged into an o-xylene rectifying tower 97 through a heater 95 and a pipe 96. The o-xylene rectifying tower 97 is an ordinary type rectifying tower provided with a reflux and a reboiler. The top distillate of the o-xylene rectifying tower is either a p-xylene concentrate or where the foregoing process condition are suitably chosen, drawn out as the pure product p-xylene, while the bottom liquid is o-xylene. The o-xylene rectifying tower used has an actual number of plates between 90 and 110, a reflux ratio between 5 and 15. Suitably selecting an actual number of plates and a reflux ratio of the o-xylene rectifying tower, o-xylene exceeding 97 mole percent may be obtained from the bottom, while p-xylene concentrate containing o-xylene less than 7 mole percent as the top distillate. When a xylene mixture having a composition similar to thermodynamic equilibrium at the temperature near 450° C. is used as the feed material for the first step of the invention, a p-xylene concentrate containing p-xylene more than 85 mole percent can be obtained as a distillate of the o-xylene rectifying tower. Depending on some conditions, the p-xylene concentration may be more than 98.5 mole percent. If the more purification of the distilled p-xylene concentrate is desired, the p-xylene concentrate is withdrawn from a pipe 110 to be delivered to p-xylene crystal separator and to be charged into a scraped surface chiller 111. The chiller 111 is operated at a temperature between $-10°$ and $0°$ C., and the p-xylene crystal formed in the chiller and mother liquor are passed to a crystal growing vessel 113. The grown crystal in the vessel 113 is sent to a centrifuge 115 through a pipe 114 and separated from the mother liquor. The centrifugal separator is kept at a temp. between $-5°$ and $+5°$ C. The crystal separated is sent to a fusing vessel 118, where it is remelted to p-xylene exceeding 99 mole percent purity, and withdrawn from a pipe 119. The mother liquor which is separated in the centrifugal separator and containing 65–75% p-xylene may be recycled with the feed xylene mixture for the first extraction step. Instead of the external cooling type chiller 111, an apparatus, where liquid ammonium or propane is directly blown into the crystal growing vessel 113 are available. A continuous refining apparatus with good efficiency may be used as an apparatus for the crystal separation.

Figure 4:
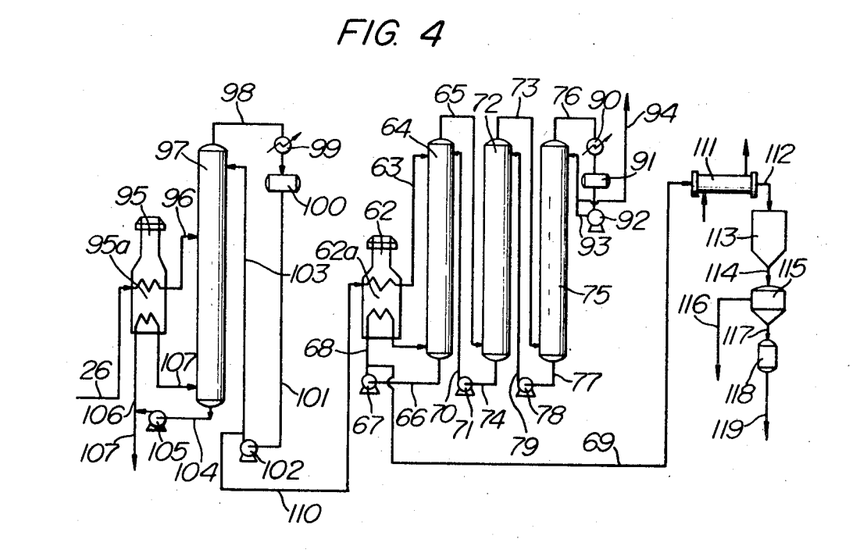
FIG. 4 is another flow diagram illustrating a modified embodiment of the present invention.

FIG. 4 shows a part of flow sheet of another process in which the order of the steps of ethylbenzene rectification and o-xylene rectification is inversed. In such a case, raffinate xylene withdrawn from the bottom of the raffinate xylene solution stripper 10 is charged to the o-xylene rectifying tower 97 through the pipe 26 and the furnace 95. The top distillate from the o-xylene rectifying tower 97 is passed through the pipe 110 to the furnace 62 for the ethylbenzene rectifying tower. The bottom stream of ethylbenzene rectifying tower 64 is either withdrawn as the pure product p-xylene, or where higher purity is needed passed through the pipe 69 and injected into the chiller 111 of the p-xylene crystal separator. For this modified process, the o-xylene rectifying tower is necessary to have an actual number of plates between 80 and 100 and a reflux ratio between 8 and 15. And the ethylbenzene rectifying tower is necessary to have an actual number of plates between 370 and 400, and a reflux ratio between 150 and 180.

In another process in which all or a part of the extract m-xylene from the m-xylene extractor 6 and/or all or a part of the rectified o-xylene, from the bottom of the o-xylene rectifying tower 97 are subjected to an isomerization reaction, to be converted to a xylene mixture having a composition similar to the thermo-dynamic equilibrium values at the reaction temperature, and thence to be recycled to the extraction step. In such a case, returning to the FIG. 3, a part of the HF extract withdrawn from the pipe 8 is sent through the pipe 45 to a preheater 49, and from the preheater 49 to an isomerization reactor 51. Extracted m-xylene to be isomerized is passed through a pipe 44b or 36a, to be mixed with the HF extract in the pipe 46 before the preheater 49. When the rectified o-xylene withdrawn from the bottom of the o-xylene rectifying tower 97 is desired to be isomerized, along with or without said extracted m-xylene, it is mixed with said HF extract in the pipe 46 before the preheater 49. To prevent side reactions, isomerization diluent such as aliphatic or aromatic hydrocarbons having 5–7 carbon atoms, and/or polymethyl benzene such as trimethyl benzene are sent through a pipe 47a to be mixed with the feed for the isomerization reactor 51. In the isomerization reactor 51, HF between 0.3 and 5.0 moles per 1 mole of xylene, and $BF_3$ between 0.03 and 0.5 mole per 1 mole of xylene to be isomerized are used. A preferable amount of isomerization diluent is between 0.3 and 3 moles per 1 mole of xylene. The isomerization reactor 51 may be one of perforated plate tower, perforated plate pulse tower, packed tower, reaction tower with stirring devices and the like. The isomerization reactor 51 hydrocarbon phase flow up concurrently. However, a reactor (not shown) in which HF phase and hydrocarbon along with a diluent. The diluent n-hexane of 100 moles A reaction temperature between $50°$ and $110°$ C., a pressure between 5 and 30 kg./cm.$^2$ and a resident time between 0.5 and 10 hours are employed. The withdrawn liquid from the isomerization reactor 51 is sent through a pipe 52 to an isomerizate stripper 53 similar to the type of the raffinate xylene solution stripper 10. From the top of the stripper 53, HF and $BF_3$ in the isomerizate, are separated. The hydrocarbon withdrawn from the bottom of the isomerizate stripper 53 is recycled to the pipe 4 in which the feed xylene mixture for the m-xylene extractor 6 flows. In some cases the bottom liquid of the isomerizate product stripper 53 is treated in a fractionator to separate a xylene fraction and a hydrocarbon fraction containing hydrocarbons more than 9 carbon atoms. And then, only xylene fraction from the top of the fractionator is recycled to the pipe 4 in which the feed xylene mixture for said m-xylene extractor 6 flows. (Piping for this case is not shown.) All the product of the isomerization reactor 51 is not always treated in the isomerizate stripper 53. A part of the product from the isomerizate reactor 51 may be, in some case, sent to a separator in which hydrocarbon phase and HF phase (catalyst) separate into two phases and a part of the HF catalyst layer may be recycled to the isomerization reactor 51 (not shown). The top distillate of the isomerizate stripper 53 is similarly treated as the top distillate of the raffinate xylene solution stripper 10.

As above described, according to the present invention almost all m-xylene in a xylene mixture can be extracted and separated as high purity m-xylene. Furthermore, from the raffinate xylene solution which is obtained by the selective extraction of m-xylene from the xylene mixture is done, high purity ethylbenzene and o-xylene, by the rectifying distillation of said raffinate xylene solution, and high purity p-xylene, either by the rectification or by the crystallization separation step, successively can be isolated. Particularly, according to the present invention following extraordinary advantageous results can be provided: that high purity p-xylene can be obtained solely by a rectification process or by successive single step, crystallization process from a temperature near $0°$ C.: that the distillation load in the process of the present invention can be greatly decreased in comparison with that of the conventional super fractionator in which only ethylbenzene or only o-xylene is distillated from a xylene mixture. Because in the present invention the rectifying distillation is done on the raffinate xylene mixture obtained after the extraction of about half amount of m-xylene contained in the xylene mixture: and that, m-xylene-$BF_3$-HF complex obtained by the selective extraction of m-xylene from the xylene mixture is subjected to an isomerization reaction to convert m-xylene to o-xylene and p-xylene, and o-xylene to m-xylene and p-xylene. Thus components in the feed xylene mixture can be converted to the most required xylene isomer with high purity.

The present invention will be illustrated by the following examples:

EXAMPLE 1

As the m-xylene extractor 6, an improved type RDC tower with 15 plates was used. The m-xylene extractor 6 was provided with a stirrer and a cooler in its top. Used feed xylene mixture had the composition: toluene 2.0 mole percent, ethylbenzene 13.0 mole percent, o-xylene 17.2 mole percent, m-xylene 48.3 mole percent, and p-xylene 19.5 mole percent. The feed xylene mixture of a rate of 100 moles per unit time was charged in a middle part of the m-xylene extractor 6 through a pipe 4. Anhydrous liquid HF of 1050 moles per unit time was supplied from a top pipe 5, and $BF_3$ gas of 105 moles per unit time supplied from a pipe 7, charge pressure of $BF_3$ gas had being 15 kg./cm.$^2$.

Crude m-xylene of 102.0 moles per unit time withdrawn from a HF extract stripper 29 was charged, as a reflux of the m-xylene extractor 6, from a pipe 36 through 37, per unit time was charged to the pipe 27. m-Xylene was extracted at a temperature inside the extractor of 0° C. and a pressure of 9 kg./cm². At the steady state of the extractor, HF extract dissolving m-xylene-BF₃-HF complex of a rate of 1306 moles per unit time was withdrawn from a bottom pipe 8 to be delivered to a HF extract stripper 29. A perforated plate tower with 26 plates was used for the HF extract stripper 29. The HF extract stripper 29 was operated under conditions of the total reflux of n-hexane, and a bottom temperature of 140° C. to remove HF and BF₃ in the HF extract. As the bottom withdrawal from the HF extract stripper 29, a crude m-xylene was obtained through a pipe 36 at a rate of 151.0 moles per unit time. The crude m-xylene had a composition of m-xylene 97.9 mole percent, other xylene isomers 1.98 mole percent and C₉ aromatic hydrocarbons 0.20 mole percent. HF and BF₃ content of the crude m-xylene was below 0.01 wt. percent and below 0.1 wt. percent, respectively. Part, 102.0 moles per unit time of the crude m-xylene was delivered to a pipe 37 to be used as a reflux m-xylene. The balance 49.3 moles per unit time of the crude m-xylene was delivered to a m-xylene fractionator 38 through a pipe 36. The m-xylene fractionator 38 was operated at a bottom temperature of 160° C. and a reflux ratio of 1.0, to obtain m-xylene fraction of m-xylene 98.0 mole percent through a pipe 38a at a rate of 48.8 moles per unit time.

Raffinate xylene solution of 150.7 moles per unit time was withdrawn from a top pipe 9 of the m-xylene extractor 6 to be delivered to a raffinate xylene solution stripper 10. For this stripper a perforated plate tower with 26 plates was used. Selected operating conditions of the stripper 10 contained a reflux ratio of 1.0, and a bottom temperature of 140° C. From the bottom, raffinate xylene containing toluene 0.05 mole percent, ethylbenzene 26.5 mole percent, o-xylene 33.4 mole percent, m-xylene 0.35 mole percent, and p-xylene 39.7 mole percent was withdrawn at a rate of 48.7 moles per unit time. Residual HF and BF₃ in the raffinate xylene was negligibly small.

REFERENCE EXAMPLE 1

Composition and rate of feed xylene mixture, rate of n-hexane diluent, purity and rate of reflux m-xylene, and the m-xylene extractor 6 were same as those in the Example 1, but BF₃ and HF was supplied at a rate of 120, and 1200 moles per unit time, respectively.

Temperature and pressure inside the m-xylene extractor 6 were same as those in the Example 1. At the steady state of the m-xylene extractor 6, HF extract of 1490 moles per unit time was withdrawn from the bottom pipe 8 to be delivered to the stripper 29. Type and operating conditions for the stripper 29 were same as those in the Example 1, but 170.4 moles per unit time of crude m-xylene was withdrawn from the pipe 36 at the bottom.

Raffinate xylene solution of 131.5 moles per unit time was withdrawn from the top pipe 9 of the m-xylene extractor 6, to be delivered to the raffinate xylene solution stripper 10. Type and operating conditions for the stripper 10 were same as those in the Example 1, but raffinate xylene of 31.5 moles per unit time was withdrawn from the bottom.

REFERENCE EXAMPLE 2

Composition and rate of feed xylene mixture, rate of diluent n-hexane, purity and rate of reflux m-xylene, and the m-xylene extractor 6 were same as those in the Example 1, but BF₃ and HF was supplied at a rate of 97 and 970 moles per unit time, respectively. Temperature and pressure inside the extractor 6 were same as those in the Example 1. At the steady state of the extractor 6, HF extract of 1202 moles per unit time was withdrawn from the bottom pipe 8 to be delivered to the stripper 29. Type and operating conditions for the stripper 29 were same as those in the Example 1, but 134.8 moles per unit time of crude m-xylene was withdrawn from the pipe 36 at the bottom.

Raffinate xylene mixture of 166.9 moles per unit time was withdrawn from the top pipe 9 of the m-xylene extractor 6, to be delivered to the raffinate xylene stripper 10. Type and operating conditions for the stripper were same as those in the Example 1, but raffinate xylene of 66.9 moles per unit time was withdraw from the bottom.

Material balances in the Example 1 and the reference Examples 1 and 2 were shown in Table 4.

TABLE 4

| | Predetermined operating conditions | Isomeric xylenes | Feed xylene mixture Moles/unit time | Feed xylene mixture Mole percent [1] | Reflux m-xylene Moles/unit time | Reflux m-xylene Mole percent [1] | Raffinate xylene Moles/unit time | Raffinate xylene Mole percent [1] | HF extract Moles/unit time | HF extract Mole percent [1] |
|---|---|---|---|---|---|---|---|---|---|---|
| Example 1 | BF₃ suitable | Toluene | 2.0 | | | | 2.0 | | | |
| | BF₃/HF=0.10 | Ethylbenzene | 13.0 | 13.2 | 0.1 | | 12.9 | 26.5 | 0.1 | |
| | γ=0.5, β=1.41 | p-Xylene | 19.5 | 19.9 | 0.7 | | 19.3 | 39.7 | 0.9 | |
| | BF₃=105 moles/unit time | m-Xylene | 48.3 | 49.4 | 99.9 | 98.0 | 0.17 | 0.35 | 148.1 | 98.0 |
| | HF=1,050 moles/unit time | o-Xylene | 17.2 | 17.5 | 1.3 | | 16.3 | 33.4 | 1.9 | |
| | Total m-xylene/BF₃=1.41 | | 100.0 | | 102.0 | | 50.7 | | 151.0 | |
| | | n-Hexane | | | 100 | | 100 | | C₉=0.3 mole/unit time | |
| Reference Example 1 | BF₃ excess | Toluene | 2.0 | | | | 2.0 | | | |
| | BF₃/HF=0.10 | Ethylbenzene | 13.0 | 13.2 | 0.1 | | 12.1 | 41.0 | 1.0 | 0.6 |
| | γ=0.5 | o-Xylene | 19.5 | 19.9 | 0.7 | | 13.0 | 44.0 | 7.2 | 4.2 |
| | BF₃=120 moles/unit time | m-Xylene | 48.3 | 49.4 | 99.9 | 98.0 | 0.11 | 0.4 | 148.0 | 86.9 |
| | HF=1,200 | o-Xylene | 17.2 | 17.5 | 1.3 | | 4.3 | 14.6 | 14.2 | 8.3 |
| | Total m-xylene/BF₃=1.23 | | 100.0 | | 102.0 | | 31.5 | | 170.4 | |
| | | n-Hexane | | | 100 | | 100 | | | |
| Reference Example 2 | BF₃ insufficient | Toluene | 2.0 | | | | 2.0 | | | |
| | BF₃/HF=0.10 | Ethylbenzene | 13.0 | 13.2 | 0.1 | | 13.0 | 20.1 | | |
| | γ=0.5 | p-Xylene | 19.5 | 19.9 | 0.7 | | 19.7 | 30.3 | 0.5 | |
| | BF₃=97 moles/unit ime | m-Xylene | 48.3 | 49.4 | 99.9 | 98.0 | 16.0 | 24.6 | 132.2 | 98.0 |
| | HF=970 moles/unit time | o-Xylene | 17.2 | 17.5 | 1.3 | | 16.2 | 25.0 | 2.1 | |
| | Total m-xylene/BF₃=1.52 | | 100.0 | | 102.0 | | 66.9 | | 134.8 | |
| | | n-Hexane | | | 100 | | 100 | | | |

[1] Mole percent based on xylene.

It is shown in the Example 1 that, when $\beta m$ value is suitably selected in accordance with $\gamma - \beta m$ diagram, both a xylene raffinate containing m-xylene 0.35 mole percent (based on xylene) and a crude m-xylene containing m-xylene 98.0 mole percent (based on xylene) can be obtained. The remaining ratio of m-xylene in the xylene raffinate which is defined by the ratio: number of moles of m-xylene remaining in the raffinate/number of moles of m-xylene in the feed stock is 0.71%. Referring to reference Example 1 in which $\alpha$ is set to a value 0.872 times as less as a suitable $\beta m$ value, a crude m-xylene of a m-xylene concentration 86.9 mole percent is obtained by using reflux m-xylene containing 98.0 mole percent m-xylene. This crude m-xylene cannot be used as reflux m-xylene. Therefore, by the operating conditions in the reference Example 1, high purity m-xylene cannot be obtained. In the reference Example 2 in which $\beta m$ is set to a value 1.08 times as much as a suitable $\beta m$ value, a xylene raffinate of m-xylene concentration 24.6 mole percent (based on xylene) and a crude m-xylene of m-xylene concentration 98.0 mole percent (based on xylene). The remaining ratio of m-xylene in the xylene raffinate is 49.8% and is greatly higher than that of the Example 1.

plates was used. Selected operating condition of the stripper 10 contained, a reflux ratio of 1.0 and a bottom temperature of 140° C. From the bottom of the stripper, raffinate xylene containing ethylbenzene 22.2 mole percent, o-xylene 38.2 mole percent, m-xylene 0.32 mole percent, and p-xylene 39.1 mole percent was withdrawn at a rate of 46.3 moles per unit time. Residual HF and BF$_3$ in the raffinate xylene was negligible.

Material balance of this extraction process was shown in the following Table 5.

TABLE 5

| Operating conditions set to | Isomeric xylene components | Feed xylene mixture | | Reflux m-xylene | | Raffinate xylene solution | | HF extract | |
|---|---|---|---|---|---|---|---|---|---|
| | | Moles/ unit time | Mole percent | Moles/ unit time | Mole percent | Moles/ unit time | Mole percent | Moles/ unit time | Mole percent |
| BF$_3$/HF=0.08 $\gamma$=0.7 $\beta m$=1.64 | Ethylbenzene | 11.0 | 11.2 | | | 10.5 | 22.6 | | |
| | p-Xylene | 18.5 | 18.8 | 163.0 | 98.0 | 18.2 | 39.1 | | |
| | m-Xylene | 49.8 | 50.6 | 3.5 | 2.0 | 0.15 | 0.32 | 212.6 | 98.0 |
| | o-Xylene | 19.2 | 19.5 | | | 17.7 | 38.0 | 4.5 | 2.0 |
| | Toluene | 1.5 | | | | 1.5 | | | |
| | Benzene | | | | | 0.5 | | | |
| | Total | | | 166.5 | | 48.75 | | 217.6 | |
| | C$_9$ | | | | | | | 0.5 | |
| | n-Hexane | | | 71.5 | | 71.5 | | | |

Note.—Mole percent is based on xylene. n-Hexane is omitted in total.

EXAMPLE 2

As the m-xylene extractor 6 an improved type RDC tower with 15 plates was used.

The m-xylene extractor 6 was provided with a stirrer and a cooler in its top section. Used feed xylene mixture had a composition: toluene 1.5 mole percent, ethylbenzene 11.0 mole percent, o-xylene 19.2 mole percent, m-xylene 49.8 mole percent, and p-xylene 18.5 mole percent. The feed xylene mixture of a rate of 100 moles per unit time was charged in a middle part of the m-xylene extractor 6 through a pipe 4. Anhydrous liquid HF of 1650 moles per unit time was supplied to a pipe 5 and BF$_3$ gas of 132 moles per unit time was supplied from a pipe 7 at a charge pressure of 15 kg./cm.² At a bottom pipe 36 reflux m-xylene of 166.5 moles per unit time of the residual m-xylene solution withdrawn from the HF extract stripper 29, was charged through 37 along with diluent. The diluent n-hexane of 71.5 moles per unit time was charged to the pipe 27. m-Xylene was extracted at a temperature inside the extractor of 0° C. and a pressure of 8 kg./cm.² At the steady state of the extractor, HF extract of a rate of 2000 moles per unit time dissolving m-xylene-BF$_3$-HF complex was withdrawn from a bottom pipe 8 to be delivered to a HF extract stripper 29. A perforated plate tower with 30 plates was used for the HF extract stripper 29. The HF extract stripper 29 was operated under conditions comprising, total reflux of n-hexane, and a bottom temperature of 140° C., to remove HF and BF$_3$ in the HF extract. As the bottom withdrawal of the HF extract stripper 29, a crude m-xylene of a rate of 217.6 moles per unit time was obtained through a pipe 36. The crude m-xylene had a composition of m-xylene 97.9 mole percent, other xylene isomers 1.97 mole percent, C$_9$ aromatic hydrocarbons 0.2 mole percent. HF and BF$_3$ remained in the crude m-xylene was below 0.01 wt. percent and below 0.02 wt. percent, respectively. Part, 166.5 moles per unit time of the crude m-xylene was delivered to a pipe 37 to be used as a reflux m-xylene, and the balance 51.1 moles per unit time of the crude m-xylene was delivered to a m-xylene fractionator 38 through a pipe 36. The m-xylene fractionator 38 was operated at a bottom temperature of 160° C. and a reflux ratio of 1.0, to obtain m-xylene fraction of m-xylene 98.0 mole percent through a pipe 38a at a rate of 50.6 moles per unit time.

Raffinate xylene solution of 120.2 moles per unit time was withdrawn from a top pipe 9 of the m-xylene extractor 6 to be delivered to a raffinate xylene solution stripper 10. For this stripper a perforated plate tower with 26

Top vapours of the raffinate xylene solution stripper 10 were delivered through a cooler 12 to a separator 14. From the bottom of the separator 14 liquid HF of 0.62 mole per unit time was withdrawn, while from the withdrawal pipe at the top vapours mainly consisted of BF$_3$ was exhausted at a rate of 0.05 mole per unit time. From the intermediate section of the separator 14 a hydrocarbon mixture mainly consisted of the diluent was withdrawn at a rate of 73.8 moles per unit time to be delivered through a pipe 17 to a diluent fractionator 18.

Residual xylene, or liquid withdrawal from the bottom of the raffinate xylene solution stripper 10 was delivered through a pipe 26, and then a furnace 62 to ethylbenzene rectifying towers 64, 72 and 75. Ethylbenzene fractionator 64, 72 and 75 forming a series of three towers were perforated plate towers with total plates of 450. An operating bottom temperature of the tower 64 was 190° C. and a reflux ratio of the tower 75 was 115.

As a top distillate, an ethylbenzene fraction containing ethylbenzene 99.6 mole percent, and p-xylene 0.4 mole percent was obtained at a rate of 10.22 moles per unit time. From a withdrawal pipe 69 connected to a pipe 66 in the bottom recycling line, a xylene fraction containing ethylbenzene 0.36 mole percent, p-xylene 50.1 mole percent, m-xylene 0.42 mole percent, and o-xylene 49.1 mole percent, was withdrawn at a rate of 36.0 moles per unit time, to be delivered through a furnace 95 to a p-xylene fractionator 97. The p-xylene fractionator 97 used was a perforated plate tower with 140 plates.

This tower 97 was operated at a bottom temperature of 165° C. and a reflux ratio of 12. As a top distillate of the p-xylene fractionator from a pipe 110 connected to a pipe 101 in the top recycling line, a p-xylene fraction containing ethylbenzene 0.73 mole percent, m-xylene 0.4 mole percent, p-xylene 98.4 mole percent was obtained at a rate of 17.8 moles per unit time.

While, a o-xylene fraction containing p-xylene 3.0 mole percent, m-xylene 0.5 mole percent, and o-xylene 97.0 mole percent, was withdrawn at a rate of 18.3 moles per unit time, from a pipe 108 connected to a recycling line pipe 104.

EXAMPLE 3

As the m-xylene extractor 6, an improved type RDC tower of 25 plates was used. In the top of the m-xylene extractor were provided with a stirrer and a cooler. Used feed material was a xylene mixture having the composition: benzene and toluene 3.0%, ethylbenzene 12.3 mole percent (12.7 mole percent) p-xylene 19.4 mole percent (20.0 mole percent), m-xylene 47.8 mole percent (49.3 mole percent), and o-xylene 17.5 mole percent (18.0 mole percent). Mole percent in the round brackets are based on xylenes. $BF_3/HF$ mole ratio $\delta$ in HF extract was 0.08. Xylene mole fraction $\gamma$ of the hydrocarbon phase in the final stage, or the HF extract withdrawal section of the m-xylene extractor 6 where said carbon phase being equilibrium with the HF extract, was 0.542. Applying these values of $\delta$ and $\gamma$ to the $\gamma-\beta m$ diagram shown in FIG. 2, $\beta m$ value 1.36 was gained. The feed xylene mixture of a rate of 100 moles per unit time was charged to a middle part of the m-xylene extractor 6 through a pipe 4. To the bottom of the m-xylene extractor 6, reflux m-xylene of 97.6 mole percent purity (98.5 mole percent based on xylene) and at a rate of 94.8 moles per unit time, and diluent n-hexane at a rate of 80 moles per unit time were supplied through pipe 27.

Quantity of n-hexane $= \dfrac{1-\gamma}{\gamma}$ $\times$ (quantity of reflux m-xylene)

$= \dfrac{1-0.542}{0.542} \times 94.8$ (moles)

$= \dfrac{0.458}{0.542} \times 94.8$ (moles)

$= 80$ (moles)

$\alpha, \alpha$ being a mole ratio of the total m-xylene (m-xylene in the feed xylene mixture plus reflux m-xylene) per unit time to $BF_3$ per unit time which are supplied to the m-xylene extractor was selected to a value $0.933\beta m$.

$\alpha = 0.993m = 0.993 \times 1.36 = 1.35$ $BF_3$, at a pressure 12.0 kg./cm.$^2$ and a rate of 104.0 moles per unit time was supplied through the pipe 7 to the top of the m-xylene extractor 6.

= total m-xylene/$\alpha$
= [100$\times$0.478 (moles)+94.8$\times$0.976 (moles)]/1.35
= [47.8 (moles)+92.6 (moles)]/1.35
= 140.7 (moles)$\div$1.35
= 104.0 (moles)

and HF was supplied through the pipe 5 to the top of the m-xylene extractor at a rate of 1300 moles per hour.

Quantity of HF = quantity of $BF_3/\delta$
= 104.0 (moles)/0.08
= 1300 (moles)

Besides these, an inside temperature of 0° C. and an inside pressure of 9 kg./cm.$^2$ were the operating conditions of the m-xylene extractor to extract m-xylene. At the steady state of the extractor, HF extract of m-xylene-$BF_3$-HF complex was delivered to a HF extract stripper 29 from the bottom pipe 8. The HF extract stripper 29 was a perforated plate tower with 30 plates. The HF extract stripper 29 was operated under conditions: total reflux of n-hexane, a bottom temperature 140° C. and an inside pressure 1 kg./cm.$^2$. Top vapours were delivered through a cooler 31 to a separator 33. From the bottom of the separator liquid HF was withdrawn at a rate of 1250 moles per unit time, and from an upper vapour withdrawal pipe 32, vapours predominantly composed of $BF_3$ were withdrawn at a rate concerning $BF_3$ of 104 moles per unit time. As the withdrawal from the bottom of HF extract stripper 29, a crude m-xylene was obtained through a pipe 36 at a rate of 140.2 moles per unit time. This crude m-xylene was m-xylene of a 97.6 mole percent purity (xylene base 98.5 mole percent). Part of this crude m-xylene of a rate of 94.8 moles per unit time which is to be used as reflux, is delivered to a pipe 27 through a pipe 37, and the balance, at a rate of 45.6 moles per unit time, was delivered to a m-xylene fractionator 38. The m-xylene fractionator 38 was a bubble cap tower being operated under conditions: reflux ratio 1.0, bottom temperature 160° C. and pressure inside tower 1 kg./cm.$^2$. Rectified m-xylene of a 98.6 moles percent purity distilled from a pipe 44 at a rate of 44.3 moles per unit time.

Raffinate xylene solution was withdrawn from a top pipe 9 of the m-xylene extractor 6, and then delivered to a raffinate xylene solution stripper 10.

This stripper was, a perforated plate tower with 26 plates and operated under the conditions: reflux ratio 1.0 bottom temperature 140° C. and pressure inside tower 1 kg./cm.$^2$.

As the bottom withdrawal of the raffinate xylene solution stripper 10, raffinate xylene was withdrawn at a rate of 49.4 moles per unit time. This raffinate xylene had a composition of ethylbenzene 24.5 mole percent, p-xylene 39.1 mole percent, m-xylene 2.0 mole percent, and o-xylene 34.4 mole percent. Residual HF and $BF_3$ left in the raffinate xylene was negligible, respectively. Top vapours of the raffinate xylene solution stripper entered in a separator 14 through a cooler 12. From the bottom of the separator 14, liquid HF of the lower phase was withdrawn at a rate of 1.0 mole per unit time, from an upper vapour withdrawal—pipe 13 vapours predominantly containing $BF_3$ was exhausted at a rate of 0.1 mole per unit time, and hydrocarbons forming an intermediate liquid phase were delivered, at a rate of 83.4 moles per unit time, to a diluent distillation tower 18 through a pipe 17. Raffinate xylene was sent to an ethylbenzene rectifying tower 64 through a furnace 62. Ethylbenzene rectifying towers 64, 72 and 75, forming a series of three towers, were perforated plate towers with total plates of 355. A bottom temperature of the ethylbenzene rectifying tower 64 was 169° C., and a reflux ratio of the tower 75 was 180.

From a withdrawal line 94 of a pipe 93 in the top reflux system of the tower 75, ethylbenzene fraction at a rate of 11.4 moles per unit time was withdrawn. The composition of the ethylbenzene fraction was of ethylbenzene 99.6 mole percent, p-xylene 0.26 mole percent, and m-xylene 0.1 mole percent.

A residual xylene of 37.9 moles per unit time was withdrawn, through a pipe 69 from a bottom recycling pass 68 of the ethylbenzene rectifying tower 64. It was delivered to an o-xylene rectifying tower 97 through a furnace 95. Used o-xylene rectifying tower 97 was a perforated plate tower with 95 plates, and operated at a bottom temperature of 169° C. and a reflux ratio of 10. o-Xylene fraction of 16 moles per unit time was withdrawn through a pipe 108 from a bottom recycling pass 106 of the o-xylene rectifying tower 97. The composition of the o-xylene fraction was p-xylene 2.1 mole percent, m-xylene 0.9 mole percent, and o-xylene 97.0 mole percent.

A p-xylene concentrate of 22.0 moles per unit time was withdrawn through a pipe 110 from a top reflux line 103 of the o-xylene rectifying tower 97, to be delivered to a scraped surface chiller 111 provided with scraper. The composition of the p-xylene concentrate was of ethylbenzene 3.18 mole percent, p-xylene 86.2 mole percent, m-xylene 3.87 mole percent and o-xylene 6.72 mole percent. The p-xylene concentrated was cooled to $-5°$ C. in the chiller 111, and then delivered to a crystal growing vessel 113 kept at $-3°$ C. and then to a centrifuge 115 through a pipe 114. p-Xylene crystals separated from the mother liquor were delivered through a pipe 117 to a melting tank 118.

The remelted p-xylene of 12.7 moles per unit time was obtained from a pipe 119. The purity of the melted p-xylene was 99.1 mole percent and the yield was 66.6 mole percent. A waste mother liquor having a composition of ethylbenzene 7.35 mole percent, p-xylene 68.5 mole percent, m-xylene 8.78 mole percent, and o-xylene 15.4 mole percent was obtained at a rate of 9.2 moles per unit time from a pipe 116. A material balance of the process to separate each xylene component from their mixture is shown in Tables 6 and 7.

TABLE 6

| Material balance | Type | m-Xylene extractor 6 Improved RDC tower | | Stripper 29 Perforated plate tower | | m-Xylene fractionator 38 Bubble cap tower | | Stripper 10 Perforated plate tower | |
|---|---|---|---|---|---|---|---|---|---|
| | Reflex ratio | 2.1 | | n-hexane total reflux | | 1.0 | | 1.0 | |
| | Number of plates | 2.5 | | 30 | | ---------- | | 26 | |
| | Pressure; kg./cm.² | 9 | | 1 | | 1 | | 1 | |
| | Temperature of tower, °C | 0 | | Bottom:140 | | Bottom:160 | | Bottom:140 | |
| | Feed material | Raffinate xylene solution | | Top distillate | | Top distillate | | Top distillate | |
| | | Moles unit time | Mole percent | Moles unit time | Mole percent | Moles unit time | Mole percent | Moles unit time | Mole percent |
| Benzene, toluene | | 3.0 | ---------- | 3.1 | ---------- | ---------- | ---------- | 3.1 | ---------- |
| Ethylbenzene | | 12.3 | 12.7 | 12.2 | 24.6 | ---------- | 0 | 0.2 | ---------- |
| p-Xylene | | 19.4 | 20.0 | 19.4 | 39.2 | ---------- | 0 | 0.2 | ---------- |
| m-Xylene | | 47.8 | 49.3 | 1.0 | 2.0 | ---------- | 43.7 | 98.6 | ---------- |
| o-Xylene | | 17.5 | 18.0 | 17.0 | 34.2 | ---------- | 0.6 | 1.4 | ---------- |
| C₉ aromatics | | | | | | | | | |
| Total | | 100.0 | 100.0 | 52.7 | 100.0 | ---------- | 44.3 | 100.0 | 3.4 |
| n-Hexanane | | ---------- | ---------- | 80 | ---------- | ---------- | ---------- | 80 | ---------- |
| HF | | 1,300 | ---------- | 1.0 | ---------- | 1,250 | ---------- | 1.0 | ---------- |
| BF | | 104.0 | ---------- | 0.1 | ---------- | 104 | ---------- | 0.1 | ---------- |

| Material balance | Reflux m-xylene | | HF extract | | Crude m-xylene solution | | Bottom withdrawal | | Raffinate xylene | |
|---|---|---|---|---|---|---|---|---|---|---|
| Benzene, toluene | | | | | | | | | | |
| Ethylbenzene | 0 | ---------- | 0 | ---------- | 0 | ---------- | ---------- | ---------- | 12.1 | 24.5 |
| p-Xylene | 0 | ---------- | 0 | ---------- | 0 | ---------- | ---------- | ---------- | 19.3 | 39.1 |
| m-Xylene | 92.6 | 98.5 | 138.8 | 98.9 | 137.2 | 98.5 | 0.9 | ---------- | 1.0 | 2.0 |
| o-Xylene | 1.4 | 1.5 | 1.55 | 1.1 | 1.9 | 1.5 | 0.1 | ---------- | 17.0 | 34.4 |
| C₉ hydrocarbons | 0.8 | ---------- | 0.95 | ---------- | 1.1 | ---------- | 0.3 | ---------- | | |
| Total | 94.8 | 100.0 | 141.2 | 100.0 | 140.2 | 100.0 | 1.3 | ---------- | 49.4 | 100.0 |
| n-Hexane | 80 | ---------- | 0 | ---------- | ---------- | ---------- | ---------- | ---------- | Trace | |
| HF | ---------- | ---------- | 129.9 | ---------- | ¹ 0.01 | ---------- | ---------- | ---------- | Trace | |
| BF₃ | ---------- | ---------- | 104 | ---------- | ¹ 0.05 | ---------- | ---------- | ---------- | Trace | |

¹ Wt. percent.

TABLE 7

| Condition | Ethylbenzene rectifying tower | o-Xylene rectifying tower 97 | Crystal separator |
|---|---|---|---|
| Type | (¹) | (¹) | ---------- |
| Reflux ratio | 180 | 10 | ---------- |
| Number of plates | 355 | 95 | ---------- |
| Pressure (kg./cm.²) | ---------- | ---------- | (²) |
| Temperature (°C) | 169 | 169 | (³) |

| Material balance | Raffinate xlyene | | Ethylbenzene fraction | | p-Xylene concentrated | | Crystal remelted solution | |
|---|---|---|---|---|---|---|---|---|
| | Moles/ unit time | Mole percent | Moles/ unit time | Mole percent | Moles/ unit time | Mole percent | Moles/ unit time | Mole percent |
| Ethylbenzene | 12.10 | 24.5 | 11.4 | 99.64 | 0.7 | 3.18 | 0.02 | ---------- |
| p-Xylene | 19.30 | 39.1 | 0.03 | 0.26 | 18.93 | 86.23 | 12.60 | 99.1 |
| m-Xylene | 1.00 | 2.0 | 0.01 | 0.1 | 0.85 | 3.87 | 0.04 | ---------- |
| o-Xylene | 16.95 | 34.4 | ---------- | 0 | 1.48 | 6.72 | 0.06 | ---------- |
| Total | 49.4 | 100.0 | 11.4 | 100.0 | 22.0 | 100.0 | 12.7 | ---------- |

| | Raffinate xylene | | residual xylene | | o-Xylene fraction | | Mother liquor | |
|---|---|---|---|---|---|---|---|---|
| Ethylbenzene | 0.7 | 1.8 | 0 | 0 | 0.68 | 7.35 | | |
| p-Xylene | 19.27 | 50.8 | 0.34 | 2.1 | 6.33 | 68.5 | | |
| m-Xylene | 0.99 | 2.6 | 0.14 | 0.9 | 0.81 | 8.78 | | |
| o-Xylene | 16.95 | 44.8 | 15.47 | 97.0 | 1.42 | 15.4 | | |
| Total | 37.9 | 100.0 | 16.0 | 100.0 | 9.24 | 100.0 | | |

¹ Perforated plate tower.
² Cooler 111=−5° C.
³ Separator 115=−3° C.

What is claimed is:

1. A process for continuously extracting and separating m-xylene from a xylene mixture containing m-xylene and at least one xylene isomer other than m-xylene in an extractor having an HF extract withdrawal section and a raffinate withdrawal section which comprises charging liquid HF and BF₃ to said raffinate withdrawal section, charging reflux m-xylene and extraction diluent to said HF extract withdrawal section, and charging said xylene mixture to said extractor at a point between said HF extract withdrawal section and said raffinate withdrawal section, and selectively extracting m-xylene in a continuous countercurrent extraction under operating conditions wherein the molar ratio of $BF_3/HF$ in the HF extract withdrawn from said extractor has a value between 0.02 and 0.12, the molar ratio $\gamma$ of reflux m-xylene to the mixture of charged diluent and reflux m-xylene has a value between 0.3 and 1.0, and the molar ratio $\alpha$ of total m-xylene charged to said extractor to $BF_3$ has a value of from 0.96 to 1.04 times the value of molar ratio $\beta m$ of m-xylene to $BF_3$ in the HF extract, $\beta m$ being determined by applying the above values of $BF_3/HF$ ratio and $\gamma$ to the $\gamma - \beta m$ equilibrium relation diagram shown in FIG. 2 wherein $BF_3/HF$ is the parameter.

2. A process for separating highly purified ethylbenzene, m-xylene, o-xylene and p-xylene from a xylene mixture comprising a first step wherein an HF extract containing an m-xylene-BF₃-HF complex, and a raffinate xylene solution substantially free of m-xylene are obtained by the selective and continuous extraction of m- xylene from said xylene mixture in an extractor charged with said xylene mixture, reflux m-xylene, diluent and liquid HF and $BF_3$ and under operating conditions wherein the molar ratio of $BF_3/HF$ in the HF extract withdrawn from said extractor has a value between 0.02 and 0.12, the molar ratio $\gamma$ of reflux m-xylene to the mixture of charged diluent and reflux m-xylene has a value between 0.3 and 1.0, and the molar ratio $\alpha$ of total m-xylene charged to said extractor to $BF_3$ has a value of from 0.96 to 1.0 times the value of molar ratio $\beta m$ of m-xylene to $BF_3$ in the HF extract, $\beta m$ being determined by applying the above values of $BF_3/HF$ ratio and $\gamma$ to the $\gamma$—$\beta m$ equilibrium relation diagram shown in FIG. 2 wherein $BF_3/HF$ is the parameter; a second step wherein said raffinate xylene solution is passed to a stripper to remove small amounts of substances boiling lower than xylene as overhead and to obtain raffinate xylene as bottoms; a third step wherein the raffinate xylene is passed to an ethylbenzene fractionator to obtain high purity ethylbenzene as overhead and rectified xylene free from ethylbenzene as bottoms; a fourth step wherein said rectified xylene is passed to a p-xylene fractionator to obtain high purity p-xylene as overhead and high purity o-xylene as bottoms; and a fifth step wherein the m-xylene-$BF_3$-HF complex from the first step is passed to an HF extract stripper to drive off HF and $BF_3$ as overhead and to obtain m-xylene as bottoms; and then passing said m-xylene bottoms to a fractionator tower to obtain high purity m-xylene as overhead and high boiling point aromatic hydrocarbons having more than 9 carbon atoms as bottoms, and feeding a portion of said high purity m-xylene or a portion of said m-xylene bottoms as reflux m-xylene in the first step.

3. A process according to claim 2 comprising a modified fourth step wherein the rectified xylene from the third step is passed to an o-xylene rectifying tower to obtain a concentrated p-xylene fraction as overhead and highly purified o-xylene as bottoms, and said p-xylene concentrate is passed to a p-xylene crystallizer to obtain highly purified crystals of p-xylene and residual mother liquor.

4. A process according to claim 2 comprising modified third and fourth steps wherein the raffinate xylene from the second step is passed to an o-xylene rectifying tower to obtain highly purified o-xylene as bottoms and p-xylene-ethylbenzene concentrate as overhead, and then said p-xylene-ethylbenzene concentrate is passed to an ethylbenzene rectifying tower to obtain ethylbenzene as overhead and p-xylene concentrate as bottoms and the p-xylene concentrate is passed to a p-xylene crystallizer to obtain crystals of highly purified p-xylene and residual mother liquor.

5. The process according to claim 2 wherein only a portion of the m-xylene-$BF_3$-HF complex from the first step is passed to the HF extract stripper and including also a sixth step wherein the balance of the m-xylene-$BF_3$-HF complex and at least a portion of the high purity m-xylene separated in the fifth step and/or at least a portion of the highly purified o-xylene separated in the fourth step are charged, with or without an isomerization diluent to an isomerization reactor to obtain an isomerization product having a composition similar to the thermodynamic equilibrium composition, and the obtained isomerized product composed of a hydrocarbon phase and an HF phase is passed to an isomerization product stripper to remove HF, $BF_3$ and the isomerization diluent and to obtain isomerized xylene as bottoms, and the obtained isomerized xylene, form which isomerization diluent has been removed or not removed is added to said xylene mixture in the first step.

6. A process according to claim 5 comprising a modified fourth step wherein the rectified xylene from the third step is passed to an o-xylene rectifying tower to obtain a concentrated p-xylene fraction as overhead and highly purified o-xylene as bottoms, and said p-xylene concentrate is passed to a p-xylene crystallizer to obtain highly purified crystals of p-xylene and residual mother liquor.

7. A process according to claim 5 comprising modified third and fourth steps wherein the raffinate xylene from the second step is passed to an o-xylene rectifying tower to obtain highly purified o-xylene as bottoms and p-xylene ethylbenzene concentrate as overhead, and then said p-xylene ethylbenzene concentrate is passed to an ethylbenzene rectifying tower to obtain ethylbenzene as overhead and p-xylene as bottoms and the p-xylene concentrate is passed to a p-xylene crystallizer to obtain crystals of highly purified p-xylene and residual mother liquor.

References Cited

UNITED STATES PATENTS 2,532,276 12/1950 Birch et al. _________ 260—668
2,848,518 8/1958 Fragen _____________ 260—674

DELBERT E. GANTZ, Primary Examiner

C. E. SPRESSER, Jr., Assistant Examiner

U.S. Cl. X.R.
260—668